United States Patent [19]
Williams et al.

[11] Patent Number: 5,088,019
[45] Date of Patent: Feb. 11, 1992

[54] LOW HARMONIC CURRENT AND FAULT TOLERANT POWER SUPPLY

[75] Inventors: James B. Williams, Westford; Bahman Sharifipour, Westborough, both of Mass.

[73] Assignee: Hewlett-Packard Company, Palo Alto, Calif.

[21] Appl. No.: 584,067

[22] Filed: Sep. 18, 1990

[51] Int. Cl.⁵ ................... H02M 7/08; H02M 7/04
[52] U.S. Cl. ........................... 363/69; 363/67; 363/143
[58] Field of Search ............ 363/65, 67, 69, 70, 363/142, 143, 43, 44, 45, 46; 323/222

[56] References Cited

U.S. PATENT DOCUMENTS

| | | | |
|---|---|---|---|
| 4,437,146 | 3/1984 | Carpenter | 363/21 |
| 4,555,753 | 11/1985 | Takahashi | 363/126 |
| 4,622,629 | 11/1986 | Glennon | 363/70 |
| 4,713,554 | 12/1987 | Henderson | 307/64 |
| 4,845,607 | 7/1989 | Nakao et al. | 363/49 |
| 4,933,832 | 6/1990 | Schneider et al. | 363/143 |
| 4,937,731 | 6/1990 | Konopka | 363/143 |
| 4,940,929 | 7/1990 | Williams | 323/222 |

Primary Examiner—Steven L. Stephan
Assistant Examiner—Ben Davidson
Attorney, Agent, or Firm—Richard F. Schuette

[57] ABSTRACT

A fault tolerant power supply comprises a first rectifier and a second rectifier with a boost circuit for correcting line current harmonics. The second rectifier, the boost circuit and output diodes are connected in parallel with the first rectifier. A capacitor circuit is charged through the second rectifier and boost converter when a 240 volt line input is present, but the circuit is charged through the first rectifier when a 120 volt line input is present. With failure of the boost converter circuit or with removal of the boost converter circuit from the system, the capacitor circuit is charged through the first rectifier.

5 Claims, 2 Drawing Sheets

LOW HARMONIC CURRENT AND FAULT TOLERANT POWER SUPPLY

BACKGROUND OF THE INVENTION

It is expected that the countries of Europe will soon begin enforcing the IEC-555 standard requiring limits on the harmonic current drawn by electrical equipment power supplies connected to a utility line. A conventional apparatus for achieving this standard can be found in U.S. Pat. No. 4,940,929 to Williams. The Williams reference uses a bridge rectifier followed by a boost circuit which assures that the current is sinusoidal and synchronized to the sinusoidal voltage. Thus, virtual unity power factor is obtained and harmonic currents are minimized.

SUMMARY OF THE INVENTION

Not all markets will require such a line harmonic current corrector. Moreover, failure of the line harmonic current corrector should not cause a system failure. I.e., the system should be fault tolerant. With a failure, the system may no longer meet the IEC-555 standard, but it should continue to function.

In accordance with the present invention, a fault-tolerant power supply comprises a first rectifier adapted to be connected in parallel with a second rectifier circuit. The second rectifier circuit includes a rectifier and a boost converter circuit to eliminate harmonics. The boost converter is a switching power supply in which the output voltage is higher than the input voltage. The boost converter minimizes the harmonic multiples of the principle frequency of the AC line current. The second rectifier and boost circuit are in modular form and can be easily connected in parallel with the first rectifier. If the module is not connected to the first rectifier or the module fails, the first rectifier operates independently without line harmonic current correction. Thus, the system represents an inexpensive, compact, and reliable means of satisfying circuit requirements in Europe, as well as elsewhere.

The peak output of the first rectifier is no greater than line voltage. Current will not flow through the first rectifier when the boost converter generates an output voltage greater than the input line voltage. Accordingly, with operation of the second rectifier and boost converter, the first rectifier is selected out in a passive fashion. Conversely, when the module containing the second rectifier and boost converter is missing or inoperative, the first rectifier serves as the power supply without active control intervention.

The system may enable the boost converter through a sample modification of a typical line voltage range selector. Where European line voltage standards (e.g., 220-240 v.) are present, the voltage sensor in the line voltage range selector generates an interlock signal which activates the second rectifier and boost converter. However, where lower line voltage standards (e.g., 110-120 v.) are used, the range selector activates a voltage doubler and the boost converter is deactivated.

The boost converter is preferably protected against several failure modes. First, a fuse protects against input short circuits. Second, two isolation diodes protect the load from short circuits in the boost converter. Thus independent failure of both the boost converter and the isolation diodes must occur to permit discharge of the load capacitor through the boost converter. Finally, over-voltage protection is provided, as by a crowbar switch (e.g., a silicon controlled rectifier).

DESCRIPTION OF PREFERRED EMBODIMENTS

Figure 1:
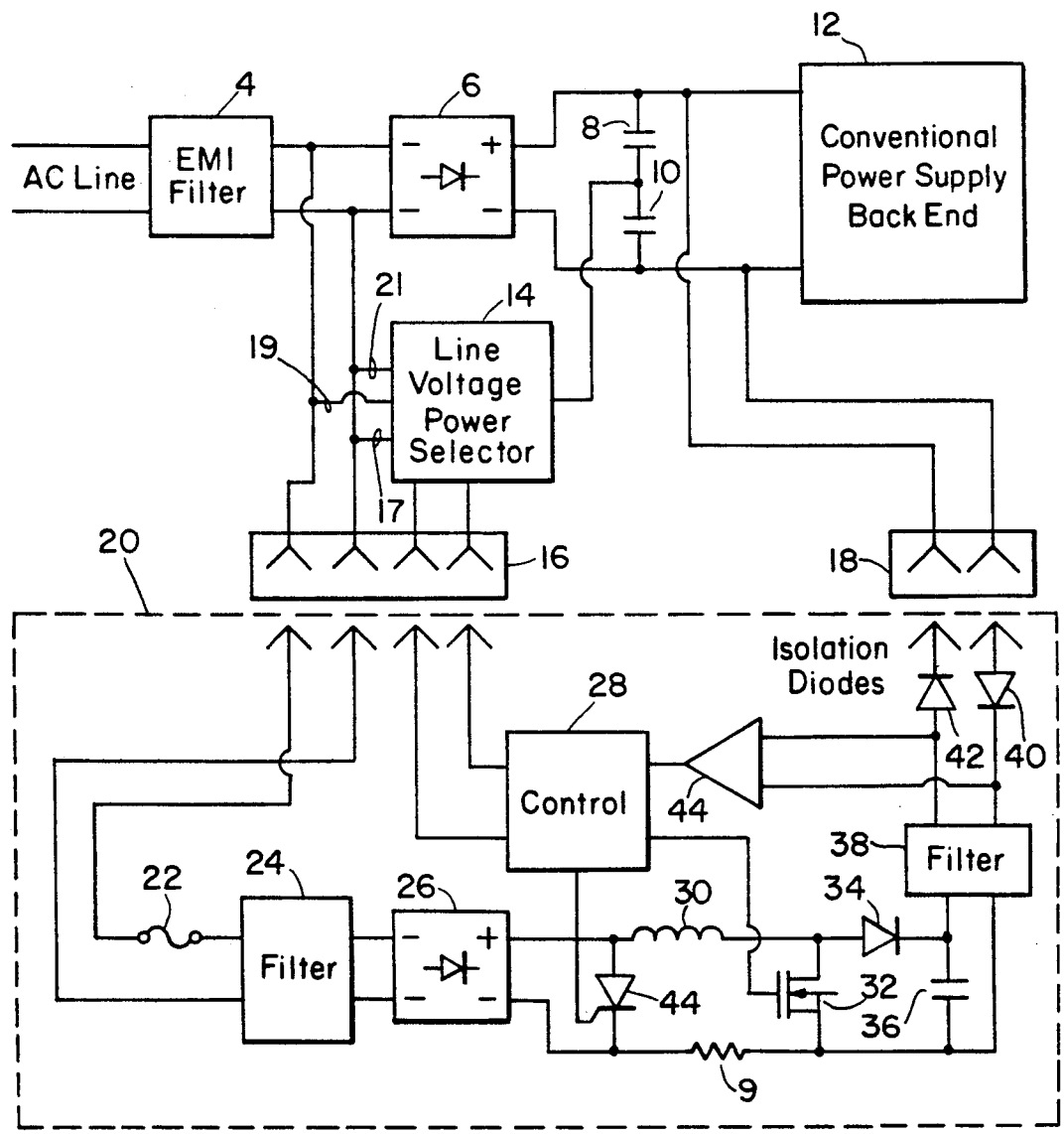
FIG. 1 is a schematic illustration of a fault tolerant power supply embodying the present invention.

FIG. 1 shows a fault tolerant power supply embodying the present invention which can service workstations, computer products, and other electrical equipment. Module 20 contains circuit elements which provide the harmonic current correction required by the European IEC-555 standard. Module 20 can be in the form of a pluggable unit which may be easily inserted. Thus, the harmonic current correction feature provided by module 20 may be added as an option only for those customers who require it. Customers in areas not requiring the IEC-555 standard need not use module 20, and significant savings are obtained. Only a minor, inexpensive modification of the standard power supply is required to provide this flexibility.

A key feature of the fault tolerant power supply is its ability to passively provide rectification of an AC line current when module 20 is missing or inoperative. The AC line is connected to EMI filter 4 which reduces the radio frequency noise on the line. The EMI filter is connected to a first rectifier 6. The first rectifier 6 may be a full bridge circuit. A first capacitor 8 and a second capacitor 10 bridge the output of rectifier 6. A line voltage range selector 14 is coupled between the first rectifier 6 input and a node connecting capacitors 8 and 10.

Figure 3:
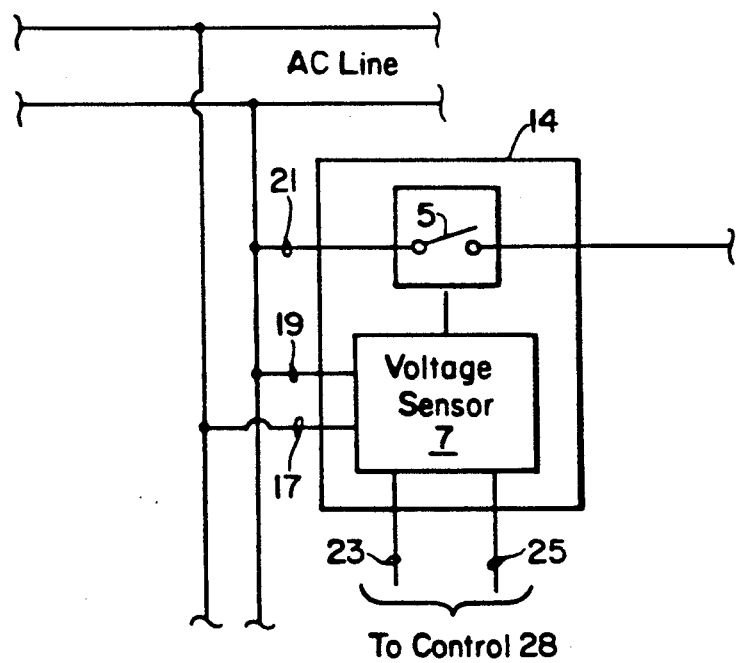
FIG. 3 is detailed illustration of the line voltage range selector of FIG. 1.

FIG. 3 illustrates an embodiment of line voltage range selector 14. A solid state switch 5 connects an input from the AC line to the node between capacitors 8 and 10. A voltage sensor 7 detects the voltage across the AC line. If the AC line voltage is in the 110-120 v. range, the voltage sensor 7 generates a signal which closes switch 5. With switch 5 closed, in a conventional fashion the combination of the first rectifier 6 and the capacitors 8 and 10 function as a voltage doubler and supply 220-240 volts to the conventional power supply back end 12. If the AC line voltage is above a predetermined level, the input is assumed to be in the 220-240 v. range, and the voltage sensor generates a signal which opens switch 5. The combination of rectifier 6 and capacitors 8 and 10 then produce a DC voltage of 220-240 v. when the AC line input voltage is also 220-240 v. Accordingly, the combination of rectifier 6 and capacitors 8 and 10 passively converts either a low or a high AC input voltage to an equivalent DC voltage.

The combination of rectifier 6 and capacitors 8 and 10 do not provide harmonic current correction. Although, line harmonic current correction is not present through the combination of rectifier 6 and capacitors 8 and 10, such a circuit still provides a usable DC voltage to the connected electrical devices even if module 20 is missing or malfunctioning. Again, it should be noted that the use of rectifier 6 and capacitors 8 and 10 is passive; no active detection of the presence of module 20 or its proper functioning is needed to transfer the power supply functions to rectifier 6 and capacitors 8 and 10.

When an operable module 20 (which includes a rectifier circuit comprising a rectifier and a boost converter) is connected to rectifier 6, capacitors 8, 10, and line voltage range selector 14, the transfer of power supply functions to the circuit elements of module 20 occur simply and easily. Connection element 16 couples the input of module 20 to the input of rectifier 6 and the AC line. Interlock signals from the voltage sensor 7 of the line voltage range selector are also connected through connection element 16 to control circuit 28 of module 20. Connection element 18 couples the output of module 20 to the output of rectifier 6 and capacitors 8 and 10. When a European standard voltage of 220–240 v. is detected on the AC line by the voltage sensor 7 of line voltage range selector 14, an interlock signal is sent to control circuit 28 in module 20. This activates the boost converter which includes inductor 30, resistor 9, transistor switch 32, diode 34, and capacitor 36. In a specific implementation, the boost converter produces a boosted output of 350–400 v. when the European standard of 220–240 v. is used as an input. Thus, a voltage of 350–400 v. is placed across capacitors 8 and 10, as well as the output of rectifier 6. Since the input voltage to rectifier 6 and module 20 is only 220–240 v., current will not flow from the AC line through rectifier 6 to the conventional power supply back end 12. Again, notice should be taken of the facility with which power supply functions are transferred. The initiation of operation of module 20 requires only a single active detector element, voltage sensor 7 in line voltage range selector 14, and that sensor is already present in typical line voltage range selectors. Once the boost converter is activated, rectifier 6 is effectively removed as a power supply.

The output of the rectifier 26 is applied to a series connection of an inductor 30, diode 34 and load capacitor 36. The charge on the load capacitor is the supply seen by the device utilizing the power. A shunting switch 32 is coupled from a node between the inductor and diode to ground. The switch is cycled at a high frequency (e.g., 40 Khz). When the switch is closed, current from the rectifier energizes the inductor. When the switch is subsequently opened, the inductor produces a current spike through the diode which charges the capacitor. The duty cycle of the switch may be controlled so that the current closely follows the voltage applied by the rectifier. Also, the output voltage stored on the load capacitor may be retained at a desired level by using feedback control of the duty cycle.

When the boost converter in module 20 is enabled, current is drawn through a fuse 22 and a filter 24. Filter 24 eliminates noise from the AC line current and prevents noise generated by the boost converter from passing back to the AC line. The signal from filter 24 is coupled to the input of rectifier 26 which is preferably a full bridge circuit. The output of rectifier 26 is connected to the boost converter which increases the rectified input voltage to 350–400 v. and minimizes the line current harmonics.

Figure 2:
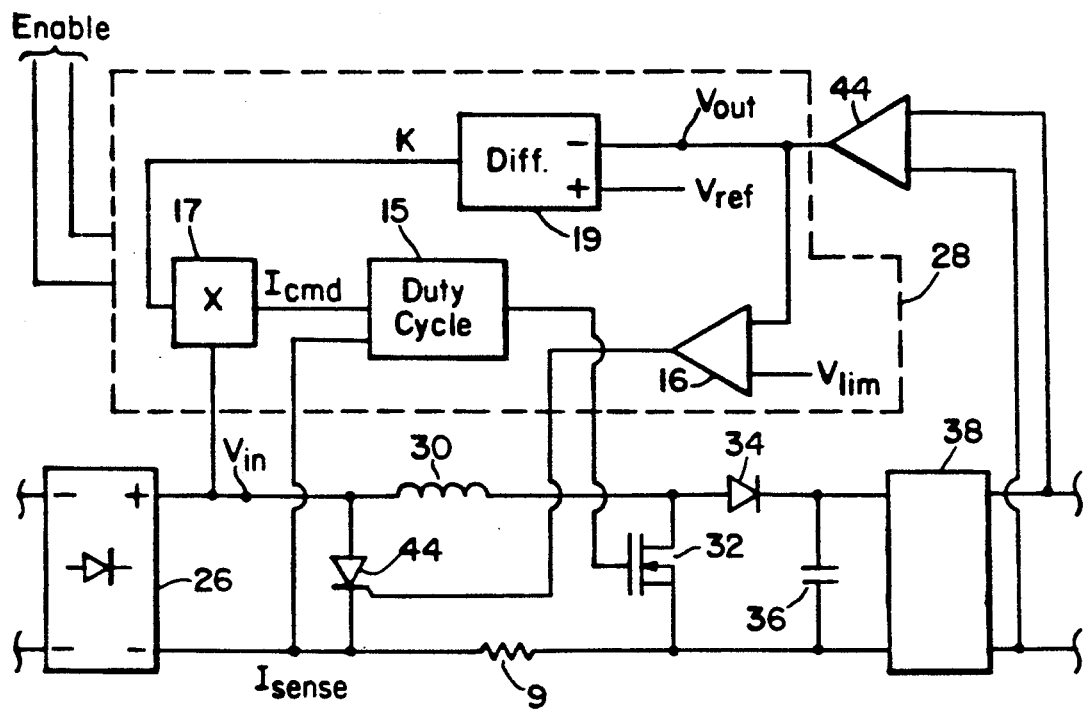
FIG. 2 is a detailed schematic of the boost converter of FIG. 1.

Details of the boost converter, including a possible design of the control circuit, are shown in FIG. 2. Inductor 30, diode 34, and capacitor 36 are connected in series. Capacitor 36 is connected across the power load through filter 38 and serves as the power supply to the load. Transistor 32 serves as a shunting switch across diode 34 and capacitor 36. The boost converter converts the rectified line voltage to a DC level on capacitor 36 to supply the load 38. Transistor 32 is switched at a constant frequency but its duty cycle is varied by the control circuit of differential circuit 19, multiplier 17, and duty cycle generator 15. Control of the duty cycle is based on the output voltage $V_{out}$ as compared to a reference voltage $V_{ref}$, an inductor current signal $I_{sense}$, and the input voltage $V_{in}$. Specifically, $V_{out}$ is derived from a differential amplifier 44 coupled across the boost converter output. The signal $I_{sense}$ is taken across current sensing resistor 9.

The switching of transistor 32 generates repetitive shunting currents followed by relaxation currents through inductor 30. The duty cycle controls the amplitude of the current and the voltage level of capacitor 36. The duty cycle is varied in accordance with the difference between the actual current through resistor 9, $I_{sense}$, and a desired current, $I_{cmd}$. $I_{cmd}$ is set equal to voltage $V_{in}$ multiplied by a constant K. Since the current to which the input is driven is a constant times a sinusoidal input voltage, the current is itself a sinusoid which is synchronized to the input voltage. As a result harmonics are minimized and near unity power factor is obtained.

Differential circuit 19 generates a value of K which provides a signal $I_{cmd}$ such that the desired output voltage, $V_{out}$, equal to $V_{ref}$ is obtained. Thus, a unity input power factor is generated and the output voltage is regulated.

The signal from the boost converter passes through filter 38 which further smooths the output. The final output is applied through isolation diodes 40 and 42 to charge capacitors 8 and 10. Should the boost converter fail, discharge of the capacitors, except through the back end 12 and load, is precluded by the diodes 40 and 42. Charge is thereafter maintained across the capacitors 8 and 10 through rectifier 6.

The circuit design of the invention provides a DC output voltage which is allowed to float up and down with the AC line voltage. As a result, the RMS current passing through the boost switch is lessened. This, in turn, reduces the average stress on the power supply components. Also, the boost converter is designed to operate with a minimum input voltage of 187 volts RMS, rather than 90 volts RMS. This effectively cuts the power rating of the circuit components in half, resulting in lower cost and a reduction in size.

Module 20 is provided with several protective features. First, a fuse 22 protects the input from a short circuit. Second, isolation diodes 40 and 42 protect the output against a short circuit. Two independent failures must occur before capacitors 8 and 10 would be discharged through module 20. Both the boost converter and the isolation diodes must fail for this to occur. Finally, over voltage protection is provided by crowbar switch 44.

Typically, a crowbar voltage protector monitors the output of a power supply and instantaneously throws a short circuit (or crowbar) across the output terminals of the power supply whenever a preset voltage is exceeded. In this embodiment, a silicon controlled rectifier 44 is connected across the output of rectifier 26. The gate of SCR44 receives a control signal from control circuit 28 which turns on the switch when the output voltage of module 20 exceeds a predetermined threshold. As shown in FIG. 2, a comparator 16 monitors the power supply output signal $V_{out}$. When a limit reference voltage $V_{lim}$ is exceeded, amplifier 16 sends an output signal which fires SCR44. The activation of the crowbar switch places a short circuit across the output of rectifier 26. Fuse 22 will then open.

While this invention has been particularly shown and described with reference to the preferred embodiments hereof, it will be understood by those skilled in the art of various changes in form and details may be made therein without departing from the spirit and the scope of the invention as defined by the appended claims. For example, the boost circuit of prior Williams U.S. Pat. No. 4,940,929 has been presented as an example. Any available boost converter which provides harmonic correction may be used in its place.

We claim:

1. A method of providing a power supply from an AC line to a capacitive load which comprises:
   providing a first rectifier in a first circuit;
   providing a second rectifier with limited harmonic current drawn from the AC line in a second circuit, wherein said first and second circuits are connected in parallel, said second rectifier having a circuit for actively controlling current therethrough to limit harmonic current drawn;
   sensing when the line voltage exceeds a predetermined voltage; and
   activating said second rectifier only when the line voltage exceeds said predetermined voltage so that said first rectifier is removed as a power supply.

2. A fault tolerant power supply for connecting an AC line to a capacitive load which comprises:
   a first rectifier with an input and an output;
   a first capacitor circuit connected to said first rectifier output;
   a second rectifier circuit with an input and an output, connected to parallel with the first rectifier, said second rectifier having a circuit for actively controlling current therethrough to limit harmonic current drawn, wherein said second rectifier circuit draws limited harmonic current from the AC line and an output voltage from said second rectifier circuit is greater than an input voltage to said second rectifier such that operation of the second rectifier circuit prevents operation of the first rectifier and failure of the second rectifier circuit permits operation of the first rectifier;
   wherein said first rectifier comprises:
   a line voltage range selector with a switch connected between the first rectifier input and the first capacitor circuit, and a voltage sensor with an input connected to the first rectifier input and an output which controls the selector switch, wherein said selector switch is closed in response to low AC line voltages so that the first rectifier and first capacitor circuits function together as a voltage doubler;
   wherein said second rectifier circuit comprises:
   a control circuit connected to an output from said voltage sensor, said control circuit generating an activating signal for said second rectifier circuit in response to said voltage sensor output indicating a high AC line voltage; and
   said fault tolerant power supply further comprising:
   an isolation diode connected between the first rectifier output and the second rectifier output to prevent discharge of the first capacitor circuit through the second rectifier circuit.

3. A fault tolerant power supply, as recited in claim 2, wherein said second rectifier comprises:
   a fuse connected to the input of said second rectifier;
   a filter, connected between said fuse and said second rectifier input, for preventing harmonic current flowing to the AC line; and
   a crowbar switch connected across the second rectifier output, said crowbar switch being closed when the control circuit detects over-voltage at the second rectifier output.

4. A fault tolerant power supply for connecting an AC line to a capacitive load which comprises:
   a first rectifier with an input and an output;
   a first capacitor circuit connected to said first rectifier output;
   a second rectifier circuit connected in parallel with the first rectifier, with an input and an output, said second rectifier having a circuit for actively controlling current therethrough to limit harmonic current drawn, wherein said second rectifier circuit draws limited harmonic current from the AC line and an output voltage of said second rectifier circuit is greater than an output voltage of the first rectifier circuit such that operation of the second rectifier circuit prevents the operation of the first rectifier and failure of the second rectifier circuit permits operation of the first rectifier, and a voltage sensor for detecting the AC line voltage, said second rectifier circuit being activated in response to an output from said voltage sensor indicating a high AC line voltage.

5. A fault tolerant power supply, as recited in claim 4, further comprising:
   an isolation diode connected between the first rectifier output and the second rectifier circuit output to prevent discharge of the first capacitor circuit through the second rectifier circuit.

* * * * *